United States Patent [19]
Stone

[11] 3,788,491
[45] Jan. 29, 1974

[54] APPARATUS FOR MOVING AN OBJECT ALONG A PREDETERMINED PATH

[75] Inventor: Charles W. Stone, Garden City, Mich.

[73] Assignee: D. W. Zimmerman Mfg., Inc., Madison Heights, Mich.

[22] Filed: May 28, 1971

[21] Appl. No.: 147,823

[52] U.S. Cl. .................. 212/25, 212/83, 212/91, 212/92, 254/168
[51] Int. Cl. .................................. B66c 17/00
[58] Field of Search ....... 212/83, 91, 71, 73, 24–27; 104/114; 214/1 B, 1 BS; 254/168

[56] References Cited
UNITED STATES PATENTS

| | | | |
|---|---|---|---|
| 456,361 | 7/1891 | Graves | 212/25 |
| 3,384,350 | 5/1968 | Powell | 254/168 X |
| 3,635,442 | 1/1972 | Graves | 254/168 |

Primary Examiner—Allen N. Knowles
Attorney, Agent, or Firm—Allen D. Gutchess, Jr.

[57] ABSTRACT

Improved drive apparatus for moving an object along a predetermined path is provided. The object to be moved is supported and guided by a member which also establishes the predetermined path with the drive apparatus moving the object between at least two given positions on the path. The drive apparatus constitutes a fluid-operated cylinder and piston combination which is effective to operate a cable drum and correspondingly move a cable which is connected to the object to be driven. The fluid-operated apparatus moves the object along the path toward the apparatus when the cable is under sufficient tension, while other means are provided for moving the object in the opposite direction. If the path is at an angle to the horizontal, the object can be moved in the direction away from the fluid-operated apparatus by gravity; if the path is horizontal or substantially so, a fluid-operated tensioning device can be provided for moving the object away from the fluid-operated apparatus.

10 Claims, 5 Drawing Figures

APPARATUS FOR MOVING AN OBJECT ALONG A PREDETERMINED PATH

This invention relates to apparatus for moving an object along a predetermined path, and more specifically to fluid-operated apparatus for moving an object between two or more positions along a member which supports and guides the object on the path.

Heretofore, various drive arrangements have been used to move an object which does not embody its own motivating force along a track or rail, for example, which supports and guides the object. The drive arrangements heretofore employed have been less than satisfactory, particularly when the object is moved over a substantial distance, for example, from several feet to fifteen or twenty feet. One drive arrangement for accomplishing this has consisted of a rack and pinion, with the rack connected to the object and in mesh with the pinion which moves both the rack and the object. Such an arrangement is cumbersome, heavy, and expensive.

A more common drive arrangement for accomplishing the same result has consisted of a fluid-operated cylinder, piston, and piston rod. However, the stroke of the piston must be at least equal to the distance which the object is to be moved. Particularly when such cylinders and pistons must be in the order of 10 feet or more in length, the cost of such a drive becomes excessive and, in any event, is space-consuming and heavy.

Another known drive arrangement for the aforesaid purpose comprises a cylinder having a double-acting piston with piston rods extending through both ends of the cylinder. The end of each piston rod is connected to the object to be moved with the cylinder and piston being located parallel to and adjacent the path of the object. Again, however, the stroke of the piston must at least equal the distance the object is to be moved and this apparatus also is expensive to manufacture even though it does not consume as much space as the aforementioned drive arrangements. Further, the double-acting piston-cylinder arrangement requires excessive maintenance, particularly with seals required at both ends of the cylinder for the piston rods. Also, if the object being moved becomes jammed, and pressure builds up within the cylinder, a very dangerous condition results.

The present invention provides an improved drive arrangement for moving an object along a predetermined path, with the path being established by an elongate member which also supports the object. The drive arrangement according to the invention constitutes fluid-operated apparatus including a cylinder having a piston mounted therein along with a cable drum which is moved by the piston and accordingly moves a cable which is connected to the object. This apparatus is effective to move the object toward the apparatus along the path with the cable in tension, and other means are provided to move the object in the opposite direction. In one instance, the member establishing the path can be placed at an angle to the horizontal with the fluid-operated apparatus adjacent an upper portion of the member. The fluid-operated apparatus then moves the object up the member toward the apparatus, while gravity moves the object in the opposite direction, down the member.

If the path established by the member is substantially horizontal, then additional fluid-operated apparatus can be employed toward the other end of the member. The latter apparatus can include a cylinder and piston with a cable drum movable by the piston and carrying a cable which is connected to the object. Fluid under constant pressure can be applied to the latter cylinder to maintain a constant tension on the cable. The object then will be moved toward the first fluid-operated apparatus when the pressure therein causes the tension on its cable to exceed that on the other cable. When the pressure in the first apparatus is lower, and the tension on the second cable exceeds that on the first cable, then the second cable moves the object away from the first fluid-operated apparatus.

The drive apparatus according to the invention has many advantages over the drive arrangements heretofore known. The new apparatus is compact, even though the path over which the object is moved may be lengthy. The apparatus is also relatively low in cost compared to arrangements heretofore known, and maintenance requirements are a minimum. Further, if the object should become jammed, the pressure in the cylinder will not build up to an excessive and dangerous amount.

It is, therefore, a principal object of the invention to provide fluid-operated drive apparatus for moving an object along a predetermined path, which apparatus is more compact, more maintenance free, less dangerous, and less expensive than drive arrangements heretofore employed.

Other objects and advantages of the invention will be apparent from the following detailed description of preferred embodiments thereof, reference being made to the accompanying drawings, in which.

Figure 1:
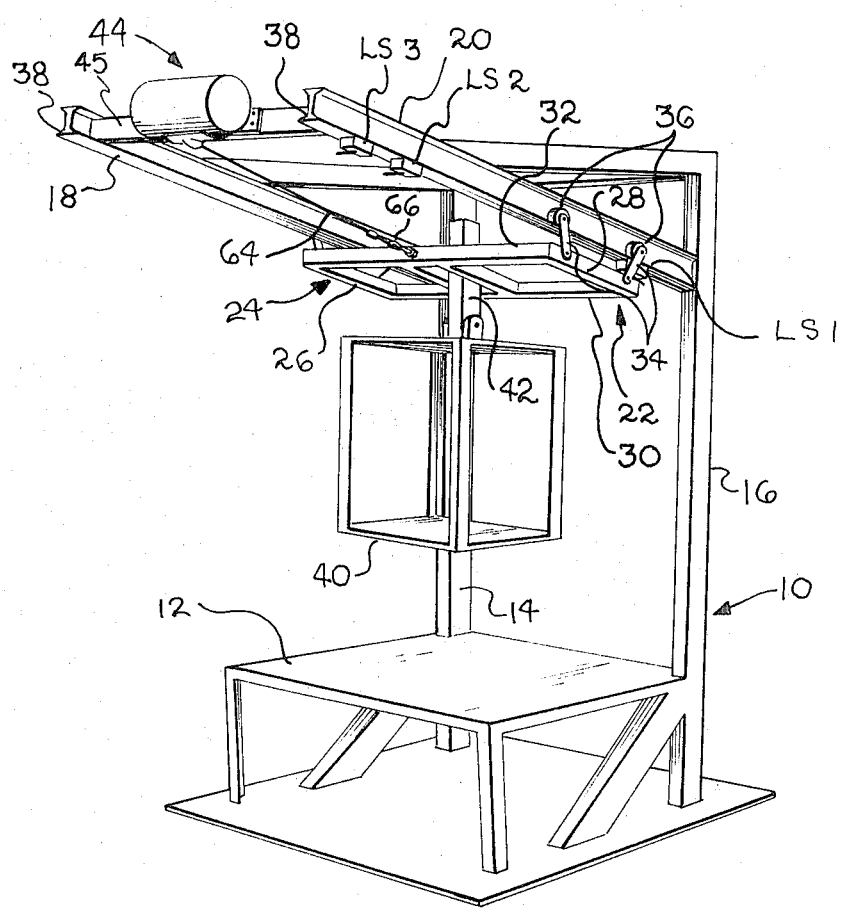
FIG. 1 is a view in perspective of a carriage, supporting member, and fluid-operated apparatus for moving the carriage in one direction along a path determined by the supporting member.

Referring particularly to FIG. 1, a framework generally indicated at 10 includes a platform 12 and uprights 14 and 16 to which angular, elongate supporting members or beams 18 and 20 are affixed. These supporting members 18 and 20 are located at an angle to the horizontal and determine an angular path for a carriage or movable object indicated at 22. The members 18 and 20 thereby both support the carriage 22 and determine the path along which it will move. The carriage 22 includes a frame 24 comprising end members 26 and 28 and cross members 30 and 32. The frame 24 is supported through links 34 and rollers 36 by flanges 38 of the members 18 and 20. For purposes of illustration, a suitable work tray 40 is supported by the carriage 22 through a vertical bar 42. Means can be provided to move the bar 42 and the tray 40 up and down relative to the carriage 22, if desired, but are not shown since such details do not constitute part of the invention.

The carriage 22 can be moved between two positions on the path determined by the supporting members 18 and 20. One position on this path can be near the lower ends of the members with the work tray 40 positioned above the platform 12. The other position can be near the upper outer ends of the members 18 and 20 at which position work on the tray 40 can be loaded or unloaded, for example. In this instance, the path for the carriage 22 as determined by the supporting members 18 and 20 is at a sufficient angle to the horizontal to cause the carriage to ordinarily move by gravity toward the first position over the platform 12. For moving the carriage 22 from the first position to the outer or second position near the outer ends of the members 18 and 20, fluid-operated apparatus indicated at 44 is mounted beyond the second position of the carriage 22 on a cross bar 45.

Figure 2:
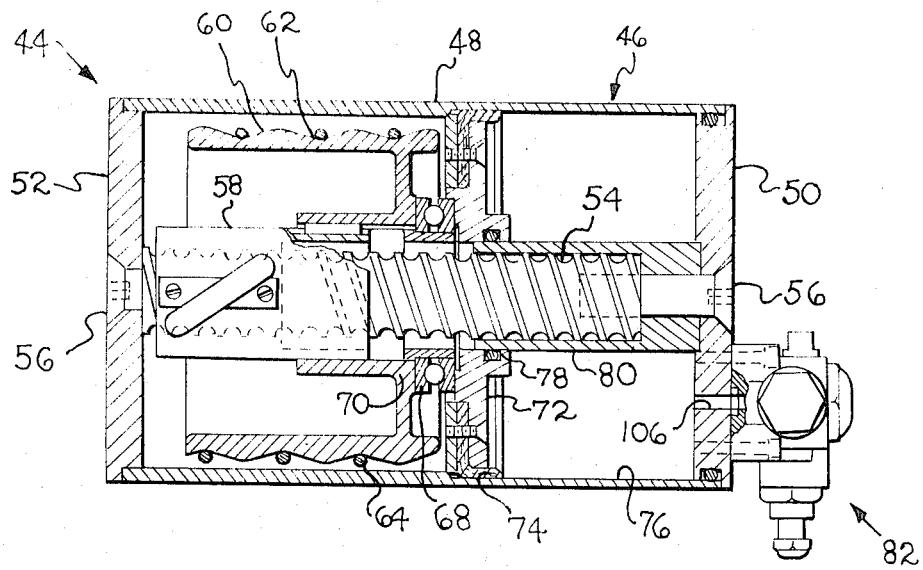
FIG. 2 is an enlarged view in vertical longitudinal cross section taken through the fluid-operated apparatus of FIG. 1.

The pneumatically operated apparatus 44 is shown in more detail in FIG. 2. A housing 46 consists of a cylindrical side wall 48 and end walls 50 and 52 with a ball screw 54 extending longitudinally through the housing. The ball screw is fastened centrally at each end to the end walls 50 and 52 by suitable machine screws 56 which also hold the end walls in assembled relationship with the housing 46. A ball screw assembly 58 is located on the ball screw 54 and moves longitudinally in the housing 46 when turned relative to the ball screw. Cable-carrying means, specifically in the form of a cable drum 60, is mounted on the ball screw assembly 58, rotating and moving longitudinally therewith. The drum 60 has a shallow helical groove 62 which receives a drive cable 64 when the drum 60 is rotated in a manner to wind the cable 64 thereon. One end of the cable 64 is suitably affixed to the drum at one end of the helical groove 62 while the other end of the cable 64 is fastened to the carriage 22 and specifically to the cross frame member 32 by means of a suitable connector or eye 66 (FIG. 1).

A thrust bearing 68 located adjacent the drum 60 bears against a hub portion 70 of the drum. The bearing 68 is engaged by a piston 72 having a peripheral seal 74 contacting the inner surface of the cylindrical wall 48 in gas-tight relationship. The end wall 50 and the right-hand portion of the housing 46 form a variable volume power chamber 76 along with the piston 72 to receive air or other suitable fluid for operating the apparatus 44. An O-ring seal 78 carried by the piston 72 enables the piston to be supported in slidable but sealing contact with a sleeve 80 which is mounted over the right end of the ball screw 54.

When air or other suitable fluid under sufficient pressure is supplied to the power chamber 76, the piston 72 is moved toward the left, as shown in FIG. 2, and through the thrust bearing 68, causes the drum 60 and the ball screw assembly 58 to move in the same direction. During this movement, the ball screw assembly rotates the drum 60 in a manner to move the cable 64 into the housing 46 and thereby move the carriage 22 along the members 18 and 20 toward the second or upper position. When the pressure in the power chamber 76 is sufficiently low, the carriage 22, acting under gravity, moves back down the members 18 and 20 to the first position. During this movement, the ball screw assembly 58, the drum 60, and the piston 72 will move toward the end wall 50, diminishing the size of the power chamber 76 and pushing the air or other fluid now under low pressure therein out of the chamber. At this time, the drum 60 rotates in a manner to unwind the cable 74 and enable the carriage 22 to pull it out of the housing 46.

Figure 3:
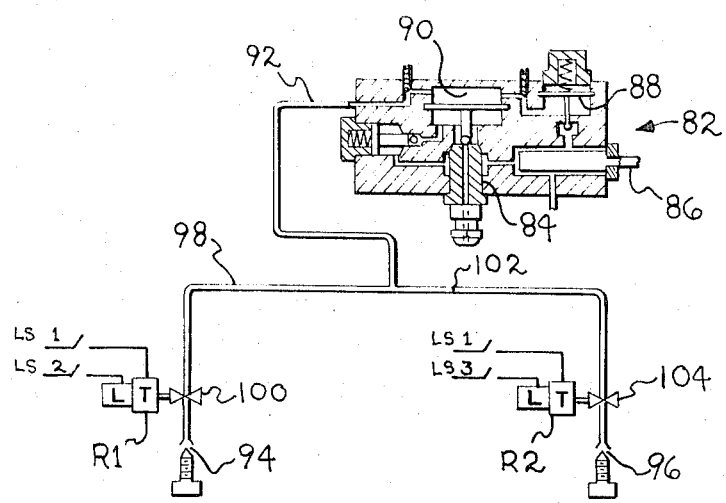
FIG. 3 is a diagrammatic view of controls used with the apparatus of FIGS. 1 and 2.

Air or other fluid under pressure is supplied to the power chamber 76 through a control 82 which is disclosed more fully in U.S. Pat. No. 3,457,837 and, consequently, will be discussed only briefly. The control 82, as shown schematically in FIG. 3, includes a main regulator 84 which controls the pressure of air supplied through a line 86 to the chamber 76. The control further includes a pilot air-controlled regulator 88 which, in turn, regulates the pressure output of the main regulator through a pilot air chamber 90 of the main regulator 84. The pilot air chamber 90 is also connected with a vent line 92 which, in turn, can be connected with one, both, or neither of two adjustable or variable vents or orifices indicated at 94 and 96. Venting of the line 92 through the vent 94 is accomplished through a branch line 98 and is controlled by a relay-operated valve 100. Similarly, venting of the line 92 through the variable vent 96 is accomplished through a branch line 102 and is controlled by a relay-operated valve 104.

When both of the valves 100 and 104 are closed, no venting occurs through the line 92 and maximum pressure is obtained in the chamber 90. Consequently, fluid under maximum pressure is also supplied by the control 82 through an opening 106 in the end wall 50 to the power chamber 76. When only the valve 100 is opened, fluid is partially vented through the variable vent 94 from the chamber 90 through the lines 92 and 98. Fluid under medium pressure is then in the chamber 76. When both of the valves 100 and 104 are opened, maximum venting is achieved through both of the variable vents 94 and 96. The chamber 90 is then under lowest pressure and the control 82 maintains fluid under minimum pressure in the chamber 76.

Under the latter condition, the force of gravity acting on the carriage 22 moves the carriage downwardly along the members 18 and 20, thereby pulling on the cable 64 and causing the drum 60 to rotate in a manner to move the piston 72 toward the end wall 50 and reduce the volume of the chamber 76. When the pressure in the chamber 76 is at either of the aforementioned first two values discussed above, the pressure is sufficient to move the piston 72 in a manner to expand the chamber 76 and cause the cable 64 to wind on the drum 60. This moves the carriage 22 upwardly along the members 18 and 20 toward the outer, second position.

The valves 100 and 104 can be controlled by any suitable means. For purposes of illustration, they are controlled by latch-trip relays R1 and R2. When latch portions L of the relays are energized, they open the valves and the valves remain open until trip portions T are energized, which then close the valves. Further, as shown, the latch portion of the relay R1 is controlled by a limit switch LS2 and the latch portion of the relay R2 is controlled by a limit switch LS3. Both of the trip portions of the relays R1 and R2 are controlled by a limit switch LS1 having a set of contacts for each of the relays. The limit switches LS1, LS2, and LS3 are mounted in the positions shown in FIG. 1 along the path of the carriage 22. The limit switch LS1 is located at the first position of the carriage 22 and is engaged by the carriage 22 when it reaches the first position. The limit switch LS2 is near the outer end of the member 20, as shown, and is engaged by the carriage 22 as it approaches its second or outer position. The limit switch LS3 is located farther out on the member 20 at the second position for the carriage 22.

In operation, assuming the valves 100 and 104 are closed, maximum pressure will be supplied to the chamber 76 through the control 82, causing the cable 64 to pull the carriage 22 from the first position toward the second position. When the carriage reaches the limit switch LS2, it closes its contacts through a mechanical trip arm, as is well known in the art, and operates the latch portion of the relay R1 to open the valve 100. The chamber 90 is then partially vented and the pressure in the power chamber 76 is correspondingly reduced, thereby causing the cable 64 to be wound more slowly on the drum 60 and slowing down the movement of the carriage 22. Thus, as the carriage approaches its second position, it slows down to avoid an abrupt stop. When the carriage 22 reaches the second position, the limit switch LS3 is also closed to operate the latch portion of the relay R2 causing the valve 104 to also open. The chamber 90 is then vented through both of the variable vents 94 and 96 to further reduce the pressure in the chamber 76 to its minimum. Gravity then operating on the carriage 22 causes it to roll back toward the first position until it reaches the limit switch LS1. This causes both of the relays R1 and R2, previously latched open by the limit switches LS2 and LS3, to be tripped, and thereby close both of the valves 100 and 104. Full pressure is then restored to the chamber 76 to cause the piston 72 to move toward the left and again wind the cable 64 on the drum 60 and move the carriage 22 back toward the second or outer position.

It is to be understood that the controls as shown are strictly for illustrative purposes and many other types of controls can be employed to accomplish the desired result. Further, various time delay arrangements can be employed to hold the carriage 22 at either of its positions for any predetermined period of time, or the venting valves can be operated manually by an operator.

Figure 4:
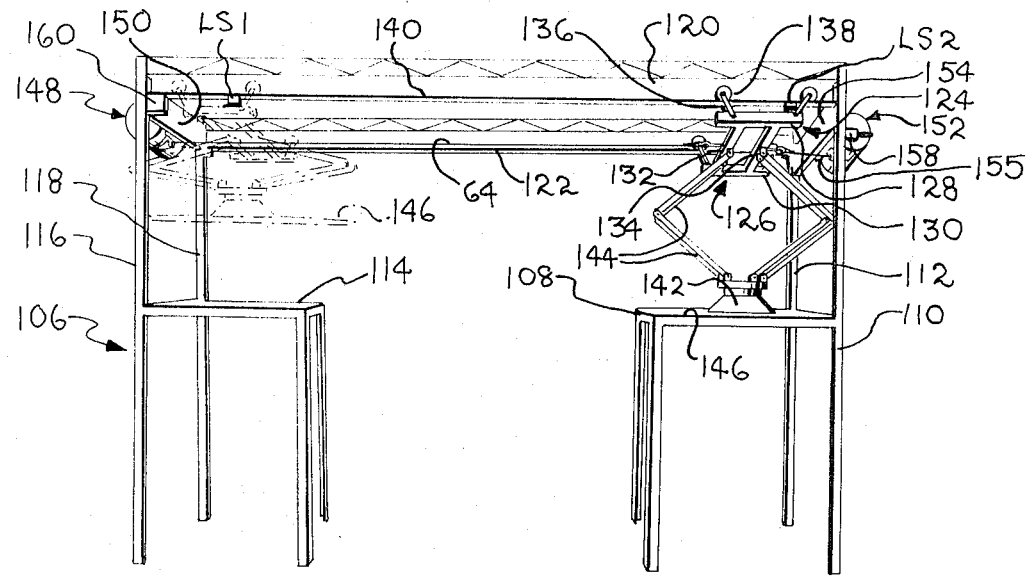
FIG. 4 is a view in perspective of a carriage, supporting member, fluid-operated apparatus for moving the carriage in one direction along a path determined by the member, and a fluid-operated device for moving the carriage in the opposite direction.

A modified drive arrangement is shown in FIG. 4. A framework generally indicated at 106 includes a first platform 108 and adjacent uprights 110 and 112 along with a second, spaced platform 114 and adjacent uprights 116 and 118. A pair of supporting members 120 and 122 extend between the upper ends of the uprights 110, 116, and 112, 118, respectively. The supporting members 120 and 122 are horizontal in this instance and again establish a path for, as well as support, a carriage or movable object 124. The carriage 124 includes a frame 126 comprising end members 128 and 130 and cross members 132 and 134. The frame 126 is supported through links 136 and rollers 138 on flanges 140 on the members 120 and 122.

For purposes of illustration, a vacuum cup 142 is supported for up and down movement below the carriage 124 by lazy-tong linkages 144 which are operated by suitable mechanism (not shown) carried on the cross members 132 and 134 of the carriage 124. The vacuum cup 142 can engage and pick up a sheet 146 of glass from the first platform 108 and raise the sheet. The carriage 124 can then be moved from a first position above the platform 108 on the horizontal path, as determined by the members 120 and 122, to a second position above the platform 114 on the horizontal path. The linkages 144 can then be manipulated to lower the vacuum cup 142 and the glass sheet 146 to the second platform 114, at which point the vacuum cup 142 can release the sheet.

To move the carriage 124 from the first position over the platform 108 to the second position over the platform 114, fluid-operated apparatus indicated at 148 is mounted on a cross bar 150 beyond the second position. With the horizontal path established by the supporting members 120 and 122, the carriage 124 cannot be moved by gravity from the second position to the first position. Consequently, in this instance, second fluid-operated apparatus 150 is mounted on a cross bar 154 beyond the first position and is connected to the carriage 124 by a cable 155.

Figure 5:
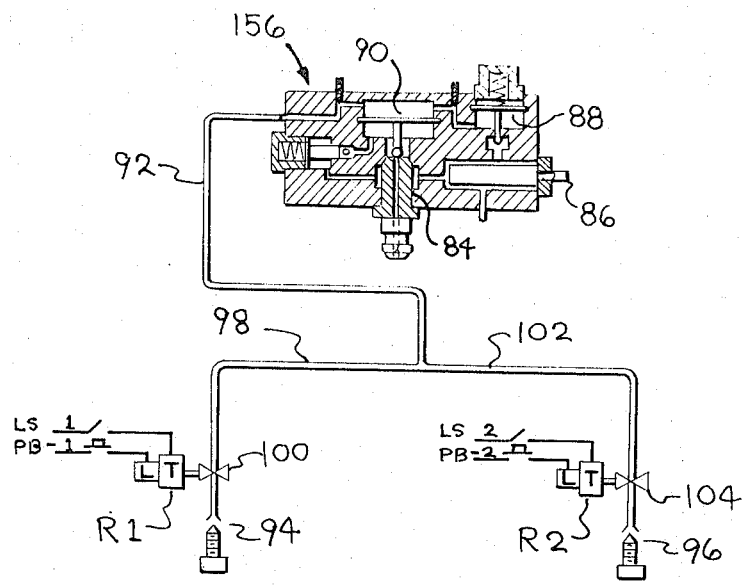
FIG. 5 is a diagrammatic view of controls used with the apparatus of FIG. 4.

The fluid-operated apparatus 148 can be identical to the fluid-operated apparatus 44, as is shown in detail in FIG. 2. A control 156 (shown schematically in FIG. 5) for the apparatus 148 can also be identical to the control 82 of FIG. 3, including the pilot air chamber 90 which is connected with the vent line 92 and the adjustable or variable vents 94 and 96. Venting through the vent 94 is accomplished through the branch line 98 controlled by the valve 100 and venting through the vent 96 is accomplished through the branch line 102 controlled by the valve 104. Again, when both valves 100 and 104 are closed, no venting occurs and maximum pressure is obtained in the chamber 90, as well as in the power chamber 76 of the apparatus 148. When one of the valves 100 and 104 is opened, fluid is partially vented and an intermediate pressure is obtained in the chamber 76. When both of the valves 100 and 104 are opened, maximum venting is achieved and minimum fluid pressure is achieved in the chamber 76.

The second fluid-operated apparatus 152 can also be constructed the same as the apparatus 148 or 44, including the power chamber 76. However, fluid for the power chamber of the apparatus 152 is controlled, in this instance, at a constant value by means of a conventional, adjustable regulator indicated at 158 in FIG. 4. The pressure controlled by the regulator 158 is preferably more than the minimum pressure in the power chamber 76 of the first fluid-operated apparatus 148 but less than the intermediate pressure in the power chamber of the apparatus 148.

In this instance, the trip portion T of the latch-trip relay R1 is controlled by a limit switch LS1 which is located on the member 120 and positioned toward the second position of the carriage 124 so as to be engaged and closed by the carriage as it approaches its second position. The trip portion T of the relay R2 is controlled by a limit switch LS2 which is located on the member 120 at the first position of the carriage 124 so as to be engaged and closed by the carriage when it is in or reaches its first position. The latch portions L of the relays R1 and R2, in this instance, are controlled by push button contacts PB-1 and PB-2 of a push button controlled by an operator and closed by the operator when it is desired to move the carriage 124 from the second position over the platform 114 along the members 120 and 122 to the first position over the platform 108.

In operation, assuming the carriage 124 to be in the first position as shown in solid lines in FIG. 4 and that it has engaged and closed the limit switch LS2, the trip portion of the relay R2 will be operated to close the valve 104 and, thus, the vent 96. With the valve 100 open, the chamber 90 is vented through the variable vent 94 and the power chamber of the power-operated apparatus 148 will be at the intermediate pressure. As mentioned above, this pressure will exceed the pressure in the power chamber of the fluid-operated apparatus 152 as controlled by the regulator 158. Consequently, the carriage 124 will be moved toward the left by the cable 64 of the apparatus 148. The carriage 124 will then move toward the second position, as indicated in dotted lines in FIG. 4. When the carriage and specifically the frame member 128 engages the limit switch LS1 and closes it, this also closes the valve 100, with the result that maximum pressure is in the pilot air chamber 90 and in the power chamber 76 of the power-operated apparatus 148. This causes the carriage 124 to be even more strongly pulled toward the left until it reaches a positive stop 160 against which the carriage is firmly held by the apparatus 148. The higher pressure in the power chamber 76 of the apparatus 148 assures that the carriage will be fully moved to and securely held in the second position and the carriage will not tend to bounce when it reaches this position as it may otherwise do under lighter pressure in the apparatus 148.

The carriage 124 remains in the second position in this instance until the push button, or any internal or external signal, is operated by the operator. When this is done, the contacts PB-1 and PB-2 are closed to operate the latch portions of the relays R1 and R2 and to open the valves 100 and 104. The carriage 124 then moves back toward the first position since the vents 94 and 96 provide maximum venting for the chamber 90 and minimum pressure is established in the power chamber of the apparatus 148. This pressure is less than the predetermined fixed pressure maintained in the power chamber of the apparatus 152 so that the force or tension on the cable 155 exceeds that on the cable 64. The push button is held closed by the operator until the carriage moves away from the limit switch LS1 so that the valve 100 will not be prematurely tripped and closed again. When the carriage 124 reaches the first position and engages the limit switch LS2, the valve 104 is closed when the trip portion of the relay R2 is actuated and medium pressure is again established in the power chamber 76 of the unit 148. This causes the carriage 124 again to move from the first position to the second position since the force or tension on the cable 64 exceeds that of the cable 155. If it is desired that the carriage remain in the first position for a period of time, suitable time delay relays or other means can be incorporated into the circuitry.

From the above, it will be seen that the drive apparatus according to the invention is capable of moving the apparatus over a path of almost any reasonable length and over paths much longer than those heretofore possible with the rack and pinion and other piston and piston rod arrangements heretofore employed for such purposes. Further, the new apparatus is compact, being entirely contained within a small volume, except for the cable itself, and further being relatively maintenance free, requiring no special seals, etc. In addition, in the event of jamming of the carriage, the fluid in the power chamber of the apparatus 148 or 152 cannot build up to excessive pressures. The apparatus is also relatively low in cost compared especially to apparatus heretofore employed, for moving objects over relatively long distances.

Various modifications of the above described embodiments of the invention will be apparent to those skilled in the art and it is to be understood that such modifications can be made without departing from the scope of the invention, if they are within the spirit and the tenor of the accompanying claims.

I claim:

1. Apparatus for moving an object between two positions comprising elongate means for movably supporting and guiding the object, said means extending between at least two positions between which the object is to be moved, a housing adjacent a portion of said elongate means beyond one of the two positions, said housing forming a cylinder therein, a piston in said housing and forming a chamber therewith, cable-carrying means in said housing and movable therein with said piston, means in said housing supporting said cable-carrying means, said cable-carrying means being rotatable when moved by said piston, a cable on said cable-carrying means and adapted to be connected with the object, regulator means for supplying fluid under pressure to said chamber, vent means for venting said regulator means, said regulator means supplying fluid under one pressure to said chamber when said vent means is in a first position and is not venting said regulator means, and said regulator means supplying fluid under a second pressure to said chamber when said vent means is in a second position and is venting said regulator means, and means adapted to move said vent means to its second position when the object is substantially at one of its two positions.

2. Apparatus according to claim 1 characterized further by said elongate means being at an angle to the horizontal and said housing being adjacent a portion of the elongate means above both of the first and second positions of the object, whereby said cable moves the object in one direction and gravity moves the object in the other direction.

3. Apparatus according to claim 2 characterized further by control means associated with said fluid supply means and including means adjacent the first position of the object and engageable by the object to control the pressure of the fluid in said chamber at a predetermined value and further including means located at the second position of the object and engageable by the object for controlling the pressure of the fluid in said chamber at a second, higher predetermined value sufficient to cause the cable-carrying means to wind the cable thereon.

4. Apparatus according to claim 1 characterized by said last-named means being located adjacent said elongate means and positioned to be engaged by the object when substantially at the one position.

5. Apparatus according to claim 1 characterized by said last-named means moving said vent means to its first position when the object is at the other position.

6. Apparatus according to claim 1 characterized by said vent means having a third position, and said regulator means supplying fluid under a third pressure to said chamber when said vent means is in the third position.

7. Apparatus according to claim 6 characterized by means associated with said elongate means for placing said vent means in the third position when the object is in a predetermined position.

8. Apparatus for moving an object between two positions comprising elongate means for movably supporting and guiding the object, said means extending at least between the two positions between which the object is to be moved, a housing adjacent a portion of said elongate means beyond one of the positions, said housing forming a cylinder therein, a piston in said housing and forming a chamber therewith, cable-carrying means in said housing and movable therein with said piston, means in said housing supporting said cable-carrying means, said cable-carrying means being rotatable when moved by said piston, a cable on said cable-carrying means and adapted to be connected with the object, means for supplying fluid under pressure to said chamber, a second housing adjacent a portion of the elongate means spaced from the first portion and located beyond the other position, said second housing forming a second cylinder therein, a second piston in said second cylinder and forming a second chamber therewith, second cable-carrying means in said second housing and movable with said second piston, means in said second housing supporting said second cable-carrying means, said second cable-carrying means being rotatable when moved by said second piston, a second cable on said second cable-carrying means and adapted to be connected with the object, means for maintaining the pressure of the fluid in said second chamber substantially constant, and control means associated with said fluid supply means for controlling the pressure of the fluid in said first chamber at either of at least two different values, one being higher than the pressure in said second chamber and one being lower than the pressure in said second chamber.

9. Apparatus according to claim 8 characterized by said means for supplying fluid under pressure to said chamber includes a regulator, and said means associated with said fluid supply means for controlling the pressure of the fluid in said first chamber comprises a vent communicating with said regulator and having a first position venting said regulator and a second position not venting said regulator.

10. Apparatus according to claim 9 characterized by means associated with said elongate means and positioned to be engaged by the object being moved for controlling the control means between its two positions.

* * * * *